(12) United States Patent
Ootuka

(10) Patent No.: US 7,499,725 B2
(45) Date of Patent: Mar. 3, 2009

(54) MOBILE TERMINAL HAVING RECORDING FUNCTION

(75) Inventor: Nobuo Ootuka, Saitama (JP)

(73) Assignee: NEC Corporation (JP)

( * ) Notice: Subject to any disclaimer, the term of this patent is extended or adjusted under 35 U.S.C. 154(b) by 109 days.

(21) Appl. No.: 10/901,626

(22) Filed: Jul. 29, 2004

(65) Prior Publication Data

US 2005/0026653 A1 Feb. 3, 2005

(30) Foreign Application Priority Data

Jul. 29, 2003 (JP) .............................. 2003-281827

(51) Int. Cl.
*H04B 7/00* (2006.01)

(52) U.S. Cl. .............. 455/556.1; 455/414.1; 455/575.1; 455/567

(58) Field of Classification Search ................ 455/403, 455/413, 414.1, 550.1, 95, 566, 567, 575.1
See application file for complete search history.

(56) References Cited

U.S. PATENT DOCUMENTS

| | | | |
|---|---|---|---|
| 6,728,341 B1 * | 4/2004 | Puchek et al. .................. | 379/49 |
| 6,738,467 B1 * | 5/2004 | Infosino ................ | 379/215.01 |
| 6,975,709 B2 * | 12/2005 | Wullert, II ................ | 379/88.23 |
| 7,024,228 B2 * | 4/2006 | Komsi et al. ................ | 455/566 |
| 7,035,385 B2 * | 4/2006 | Levine et al. ............ | 379/88.23 |
| 7,088,991 B2 * | 8/2006 | Nakajima ................ | 455/412.1 |
| 7,103,395 B2 * | 9/2006 | Mori ........................ | 455/575.1 |
| 2001/0041590 A1 | 11/2001 | Silberfenig et al. | |
| 2002/0193080 A1 | 12/2002 | Komsi et al. | |

FOREIGN PATENT DOCUMENTS

| | | |
|---|---|---|
| EP | 0 954 150 | 11/1999 |
| JP | 2000-92360 | 3/2000 |
| JP | 2000-156812 | 6/2000 |
| JP | 2002-57756 | 2/2002 |
| JP | 2002-185601 | 6/2002 |
| JP | 2003-198716 | 7/2003 |
| WO | WO 99/39490 | 8/1999 |
| WO | WO 01/91424 | 11/2001 |

OTHER PUBLICATIONS

Office Action issued by Japanese Patent Office in connection with corresponding Japanese application No. 2003-281827 on May 23, 2006.
English translation of relevant parts of Office Action issued by Japanese Patent Office on May 23, 2006 in connection with corresponding Japanese application No. 2003-281827.

(Continued)

*Primary Examiner*—Tony T Nguyen
(74) *Attorney, Agent, or Firm*—Ostrolenk, Faber, Gerb & Soffen, LLP

(57) ABSTRACT

A mobile terminal such as a cellular telephone can include a voice recording function. Upon arrival of an incoming call when the cellular telephone is executing a recording operation, the cellular telephone informs of the arrival of the incoming call by any one of or both of an incoming call display on a display unit and light emission of light emitting means. At this time, the cellular telephone stops a sound generating operation and a vibrating operation which affect the recording operation. The recording stops temporarily when a user answers the incoming call.

7 Claims, 2 Drawing Sheets

OTHER PUBLICATIONS

Office Action issued by Chinese Patent Office in connection with corresponding Chinese application No. 2004-1007195.3 on Oct. 12, 2007.

English translation of Office Action issued by Chinese Patent Office on Oct. 12, 2007 in connection with corresponding Chinese application No. 2004-10071095.3.

* cited by examiner

MOBILE TERMINAL HAVING RECORDING FUNCTION

BACKGROUND OF THE INVENTION

1. Field of the Invention

The present invention relates to a mobile terminal, more specifically, to a mobile terminal having a recording function.

2. Description of the Related Art

The techniques of recording voices and images by use of memory cards incorporating semiconductor memories are widespread in recent years. A memory card is small in size and is therefore applicable as a voice recording medium for a cellular telephone. Many voice recordable cellular telephones have been already proposed. For example, Japanese Unexamined Patent Publication No. 2002-057756 discloses a cellular telephone which stops transmission and reception of radio waves while recording. In this cellular telephone, a vibrating operation and a sound generating operation for informing of arrival of an incoming call do not interfere with the recording. However, a user cannot detect arrival of an urgent incoming call while the recording. Therefore, the user has to wait for another incoming call after completion of the recording.

SUMMARY OF THE INVENTION

A mobile terminal according to the present invention includes a display unit, a control unit, and incoming call informing means. The incoming call informing means includes at least any one of a vibration generation unit and a sound generation unit. Moreover, upon arrival of an incoming call in the course of a recording operation, the control unit informs of the arrival of the incoming call by an incoming call display on the display unit without activating the vibration generation unit and the sound generation unit. The mobile terminal may include light emitting means. The control unit can inform of the arrival of the incoming call by at least any one operation of light emission of the light emitting means and the incoming call display on the display unit.

A user of this mobile terminal can detect arrival of an incoming call in the course of recording without affecting the recording.

BRIEF DESCRIPTION OF THE DRAWINGS

The above and other objects, features and advantages of the present invention will become apparent from the following detailed description when taken with the accompanying drawings in which.

DETAILED DESCRIPTION OF THE PREFERRED EMBODIMENT

Figure 1:
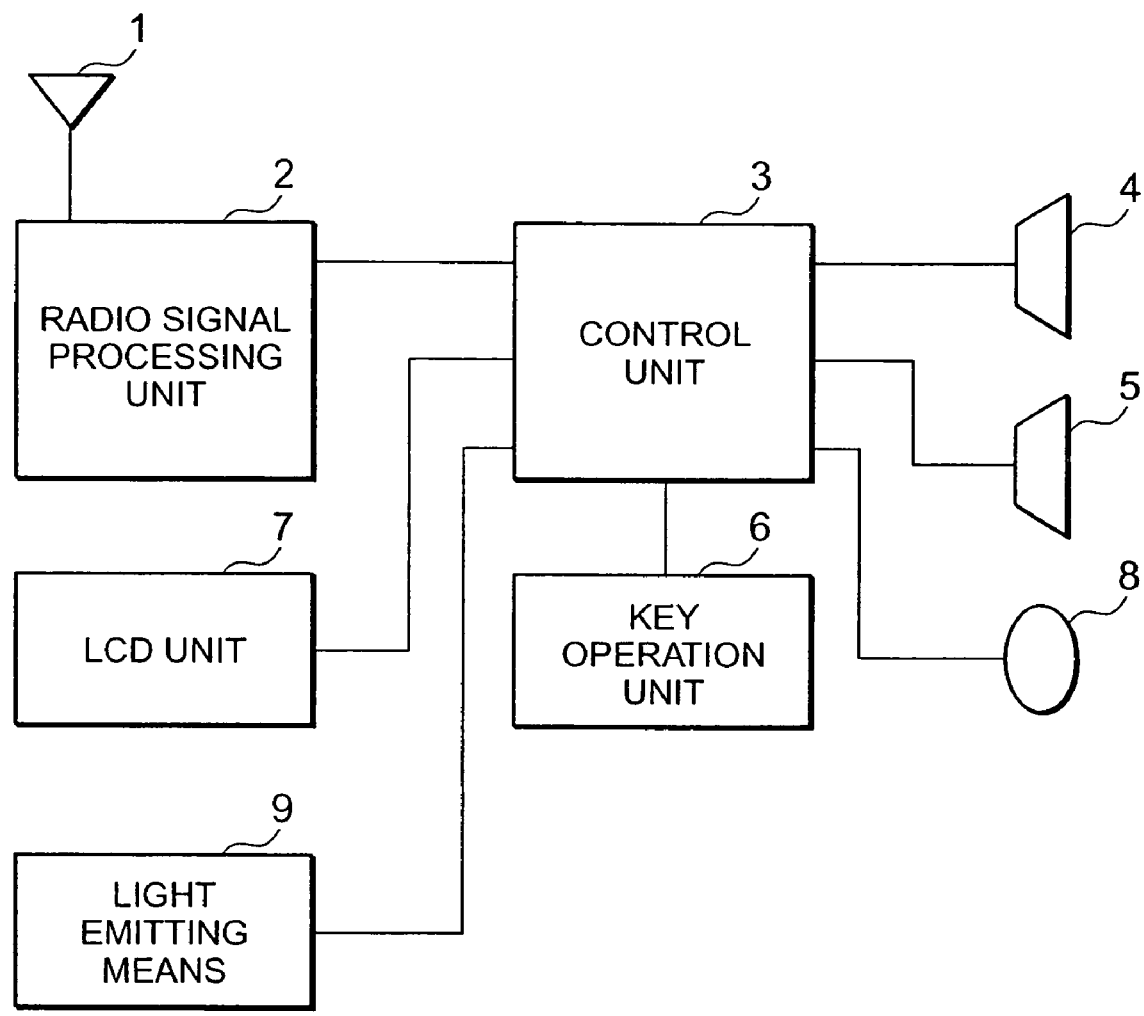
FIG. 1 is a block diagram of a mobile terminal according to an embodiment of the present invention.

A preferred embodiment of a mobile terminal according to the present invention will be described below. Referring to FIG. 1, a cellular telephone as a concrete example of the mobile terminal includes an antenna 1, a radio signal processing unit 2, a control unit 3, a key operation unit 6, and a liquid crystal display (LCD) unit 7. The cellular telephone further includes a microphone 4, a speaker 5, and a vibrator 8. The speaker 5 and the vibrator 8 inform of arrival of an incoming call. In this example, the control unit 3 incorporates a semiconductor memory. In another example, the cellular telephone may include a detachable semiconductor memory. In a standby mode of the cellular telephone, the control unit 3 starts recording voices inputted from the microphone 4 when a voice recording key in the key operation unit 6 is pressed down. Voices and other information to be recorded may be also inputted from a dedicated terminal. When detecting arrival of an incoming call in the course of the voice recording, the control unit 3 inhibits an incoming call informing operation by the speaker 5 or the vibrator 8. Simultaneously, the control unit 3 causes the LCD unit 7 to perform an incoming call display. This display may include a message informing of the arrival of the incoming call, and information for specifying a caller (such as a telephone number, a full name, a name and an abbreviated name). The cellular telephone may include light emitting means 9 (e.g. LED). In this case, the control unit 3 can inform of the arrival of the incoming call by causing the light emitting means 9 to emit light. The control unit 3 can execute the display on the LCD unit 7 and the light emission of the light emitting means 9 at the same time.

The recording continues when a user does not start a talk operation for the arrival of the incoming call (i.e. an answering operation for the arrival of the incoming call). The user can press down a recording pause key provided in the key operation unit 6 to stop the recording. When the user presses down this key again, the recording starts again. Moreover, the user can set the control unit 3 to stop the recording automatically when the user responds to the incoming call. The control unit 3 can include a function to send a given voice message back to the caller when the incoming call arrives in the course of the recording operation.

Figure 2:
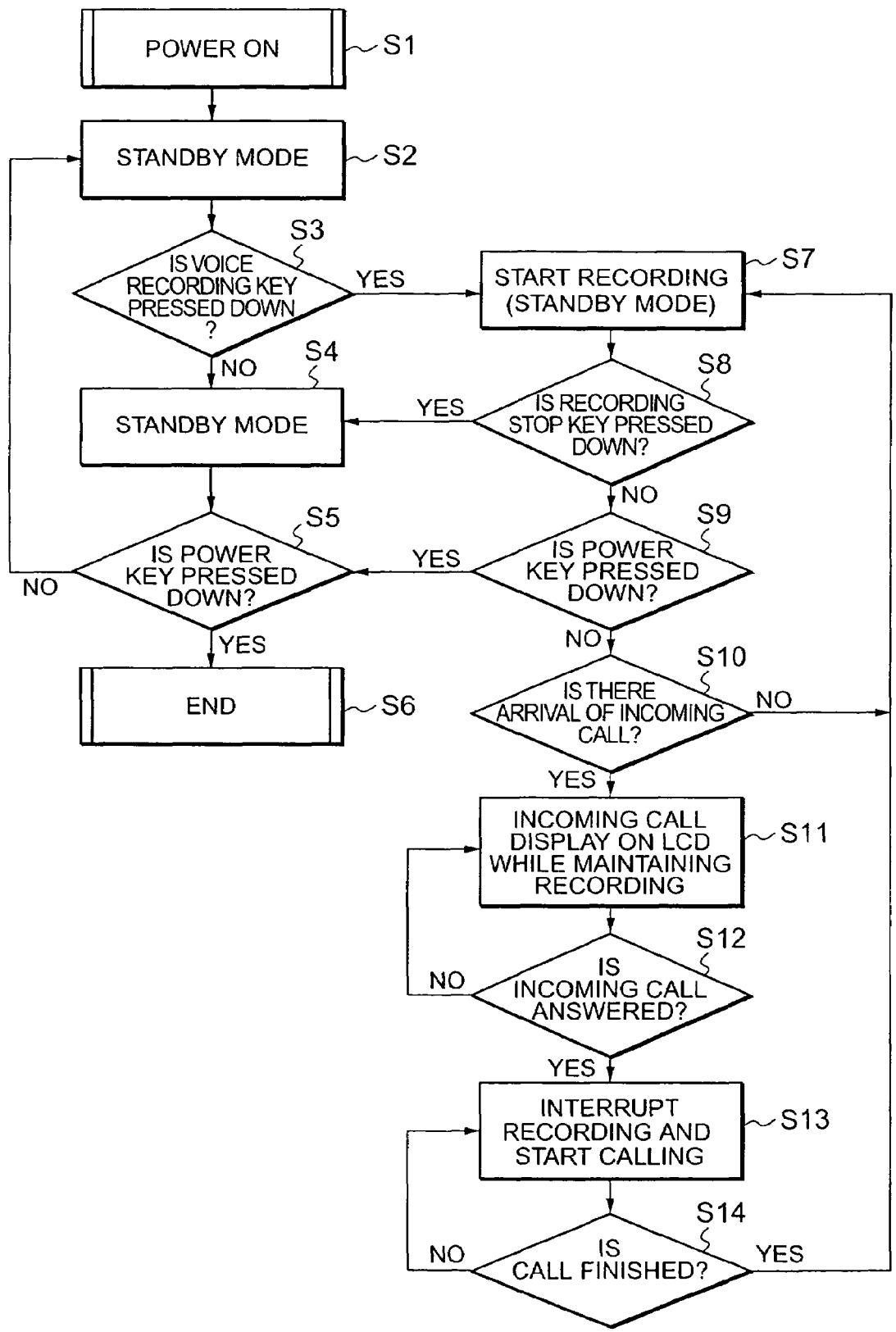
FIG. 2 is a flowchart showing an operation example of the mobile terminal.

FIG. 2 shows an operation example of the above-described cellular telephone. When the cellular telephone is turned on (S1), the telephone is set to a standby mode (S2). The control unit 3 monitors whether or not the voice recording key in the key operation unit 6 is pressed down (S3). When the voice recording key is not pressed down (NO in S3), the standby mode is maintained (S4). When a power key is not pressed down (NO in S5), the telephone waits for an operation of the voice recording key in the standby mode. When the power key is pressed down (YES in S5), the telephone terminates all the operations (S6).

On the contrary, when the control unit 3 detects that the voice recording key is pressed down (YES in S3), the cellular telephone starts recording while maintaining the standby mode (S7). Thereafter, the control unit 3 monitors whether or not a recording stop key is pressed down (S8). When the recording stop key is pressed down (YES in S8), the control unit 3 stops the recording and causes the cellular telephone to be in the normal standby mode (S4). When the recording stop key is not pressed down (NO in S8), the recording operation continues. The control unit 3 monitors whether the power key is pressed down (S9), and terminates all the operations of the telephone when the power key is pressed down (S6). When the power key is not pressed down (NO in S9), the recording operation continues. When an incoming call arrives at this time (YES in S10), the control unit 3 stops sound generation and activation of the vibrator for informing of the arrival of the incoming call, and causes the LCD unit 7 to perform the incoming call display while maintaining the recording operation (S11). Despite the arrival of the incoming call, the recording continues when the user does not execute an operation to answer the incoming call (NO in S12). When the user answers the incoming call (YES in S12), the recording is interrupted and a talk starts (S13). When the call is finished (YES in S14), the cellular telephone is set to the standby mode (S7), which enables the recording operation. It is possible to execute the recording operation unless the recording stop key is pressed down (S8) or the power key is pressed down (S9). When the cellular telephone includes the light emitting means, the control unit 3 can inform of the arrival of the incoming call by causing the light emitting means to emit light in stead of or together with the display on the LCD unit 7.

The cellular telephone according to the present invention can detect arrival of an incoming call even in the course of recording, and the arrival of the incoming call does not affect the recording. Moreover, a user can confirm a caller and interrupt the recording to answer the incoming call when needed.

While the present invention has been described in connection with a certain preferred embodiment, it is to be understood that the subject matter encompassed by the present invention is not limited to this specific embodiment. On the contrary, it is intended to include all alternatives, modifications, and equivalents as can be included within the spirit and scope of the following claims.

What is claimed is:

1. A mobile terminal having a recording unit operable in a non-call standby mode recording operation to record a sound detected via a microphone from a surrounding area of the mobile terminal, the mobile terminal comprising:
    a display unit;
    an incoming call informing unit, including at least any one of a vibration generation unit or a sound generation unit; and
    a control unit operable to inform of an arrival of an incoming call upon the arrival of the incoming call during the non-call standby mode recording operation to record the sound detected via the microphone of the recording unit by transmitting a signal for an incoming call display on the display unit without activating the vibration generation unit and the sound generation unit and without interruption of the non-call standby mode recording operation to record the sound detected via the microphone.

2. The mobile terminal according to claim 1, further comprising:
    a light emitting unit,
    wherein the control unit informs of the arrival of the incoming call upon the arrival of the incoming call in the course of the recording operation by at least any one operation of light emission of the light emitting unit and the incoming call display on the display unit without activating the vibration generation unit and the sound generation unit.

3. The mobile terminal according to claim 1,
    wherein the control unit temporarily stops the recording operation when answering the incoming call in the course of the recording operation.

4. The mobile terminal according to claim 3, wherein the control unit starts the recording operation after finishing a call.

5. The mobile terminal according to claim 1, further comprising:
    a key unit for temporarily stopping the recording operation.

6. The mobile terminal according to claim 1, wherein the display on the display unit includes information concerning a caller.

7. The mobile terminal according to claim 1, further comprising:
    a voice message unit operative to send a given voice message back to a caller of the incoming call when the incoming call arrives in the course of the recording operation.

* * * * *